C. CARSON.
ODOMETER.
APPLICATION FILED JUNE 10, 1915. RENEWED AUG. 11, 1919.

1,319,205.

Patented Oct. 21, 1919.

Inventor
Clarence Carson

By his Attorneys
Messimer and Austin

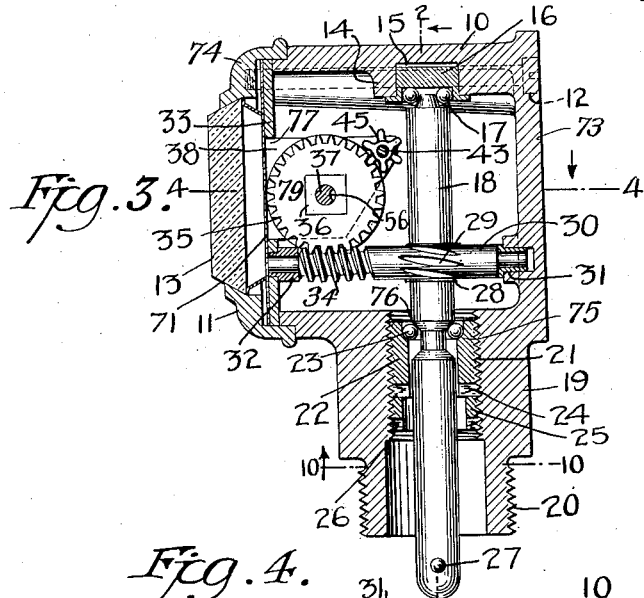

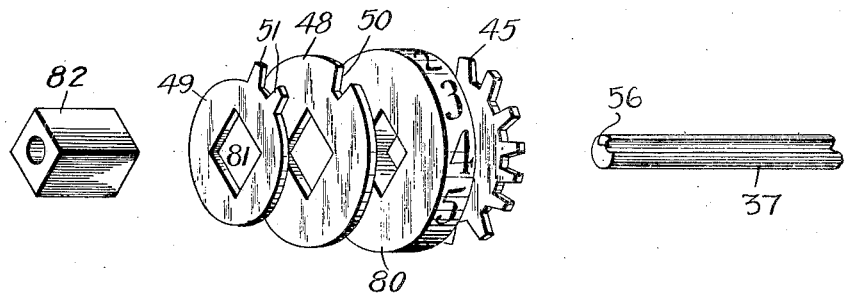
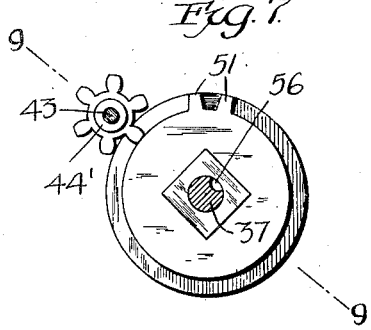
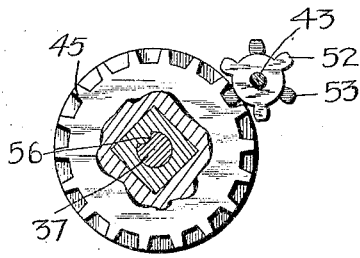
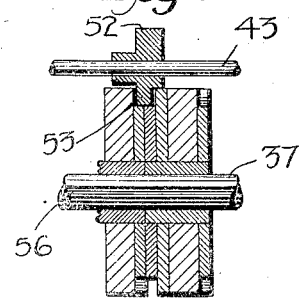
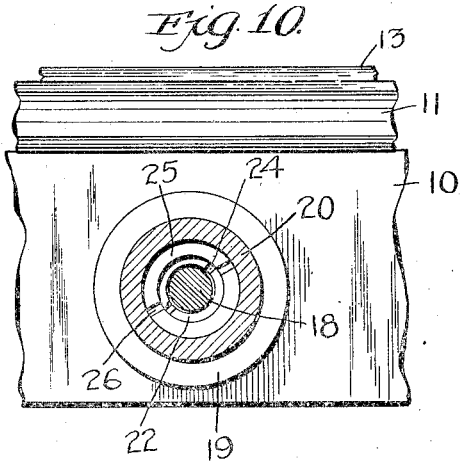

UNITED STATES PATENT OFFICE.

CLARENCE CARSON, OF NEW ROCHELLE, NEW YORK, ASSIGNOR TO H. W. JOHNS-MANVILLE COMPANY, A CORPORATION OF NEW YORK.

ODOMETER.

1,319,205.   Specification of Letters Patent.   Patented Oct. 21, 1919.

Application filed June 10, 1915, Serial No. 33,255. Renewed August 11, 1919. Serial No. 316,560½.

*To all whom it may concern:*

Be it known that I, CLARENCE CARSON, a citizen of the United States, and resident of New Rochelle, in the county of Westchester and State of New York, have invented certain new and useful Improvements in Odometers, of which the following is a specification.

My invention relates to a revolution counter of general application and more specifically relates to an odometer particularly designed for use on motor vehicles.

One of the objects of my invention is to provide a simple form of instrument of the above indicated class, formed of an assemblage of standard and interchangeable parts which are designed to form an instrument positive and accurate in its registration and in which the parts will not be affected by vibration or jerky movements of the vehicle or other support carrying the same.

It is a further object of my invention to provide a revolution counter designed so that by a simple change or re-arrangement of a minor part, the standard instrument may be utilized for use with either a right hand or a left hand driving element, and it is a still further object of the invention, when considered as an odometer, to provide both a distance and a trip set of indicating mechanism, the trip set of which may be re-set manually to give any desired initial reading without affecting the distance set of indicating mechanism.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Fig. 3 is a vertical sectional view taken on the line 3—3 of Fig. 2 looking in the direction indicated by the arrow;

Fig. 4 is a horizontal sectional view taken on the lines 4—4 of Figs. 3 and 4 looking down as indicated by the arrow in each of these figures;

Fig. 5 is an enlarged detail view in perspective of the rear face of the mounting plate;

Figure 1:
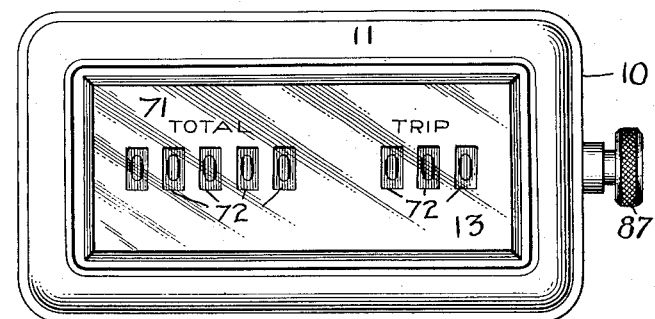
Figure 1 is a front elevation of a preferred embodiment of my invention shown in upright position.
Figure 2:
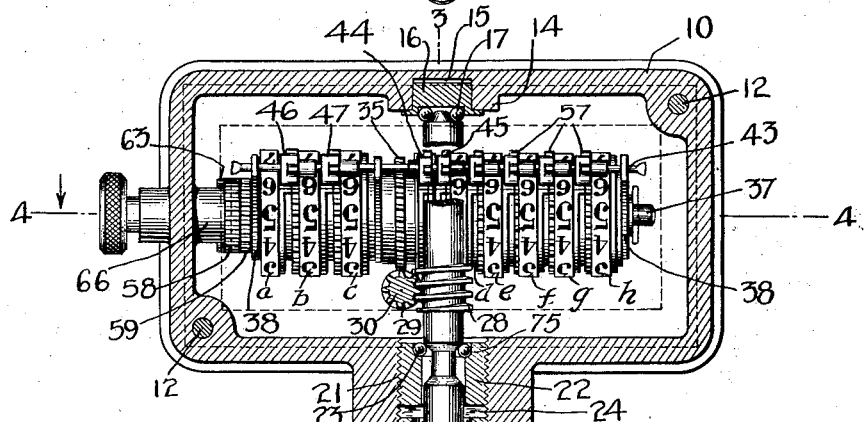
Fig. 2 is a vertical sectional view taken in a plane parallel to the view of the device shown in Fig. 1 and taken on the line 2—2 of Fig. 3 looking in the direction indicated by the arrow.

Figs. 6 to 10 inclusive are detailed views showing parts of the indicating mechanism;

Fig. 6 showing disconnected parts of a numeral wheel unit;

Figs. 7, 8 and 9 being respectively sectional views taken on the lines 7—7 of Figs. 4, 8—8 of Fig. 4 and 9—9 of Fig. 7 and Fig. 10 is a transverse section through the mounting hub and taken on the line 10—10 of Fig. 3 looking toward the frame of the instrument.

In the following description and in the claims, parts will be identified by specific names for convenience of expression but they are intended to be as generic in their application to similar parts as the art will permit.

Referring to the accompanying drawings, there is shown a mechanism containing casing 10 conveniently designed in the form of a box having a closed back 73 and an open front end closed by a cover 11 secured thereto by screws 12. This cover includes a frame 74 constituting means for holding the glass front 13 in position. The casing is provided with an internal boss 14, counter-bored to form a recess 15 into which is inserted the end thrust bearing 16 for the main driving shaft 18. The inner end of this shaft is reduced and mounted to rotate against anti-friction devices 17, such as rollers, carried by the end thrust bearing. The casing is also provided with an outwardly projecting hub 19 diametrically disposed opposite the end thrust bearing. The outer end of the hub is reduced and provided with external threads 20 for mounting the device in position or for attaching the same to some part of the driving element. The inner portion of the bore of the hub is threaded as shown at 21 adjustably mounted in which threaded portion is the shaft bearing 22 which is provided with a runway 75 for containing the anti-friction devices 23, such as rollers, bearing on the shoulder 76 on the shaft to constitute an end thrust bearing coacting with the devices 17 to rotatably mount the shaft free of longitudinal movements. The threaded portion of the hub 19 also contains a lock-nut 25 provided with screw-driver slots 26, which slots together with the similar slots 24 on the bearing, is adapted to be engaged by a screw driver inserted through the end of the hub 19 to lock the bearing 22 in its adjusted position.

The part of the shaft 18 within the casing is provided with a worm gear 28 meshing with the worm-gear 29 formed by a series of inclined indentations cut in a demountable register driving shaft 30. The shaft 30 laps the shaft 18; the rear end thereof is mounted in end bearings 31 in the back wall 73 and the forward end thereof is mounted in bearings 32 formed in a removable front mounting plate 33.

This mounting plate and the parts attached thereto constitute a complete register demountable as a unit from the casing. This mounting plate is provided with a pair of end brackets 38 fixed in position and formed preferably by cutting tongues from the body of the plate and bending these tongues at right angles thereto to form an elongated sight opening 77 centrally in the plate. A supporting plate 39 is adapted to be positioned between the end brackets and to parallel the same with a relatively broad portion thereof engaging the plate transversely of the length of the register shaft 37 hereinafter described. The plate 39 is preferably provided with shoulders 78 designed to have a sliding fit with opposite sides of the sight opening. The end brackets and the supporting plate are each provided with apertures 41 constituting bearings in which the shaft 37 is rotatably mounted. The brackets and support are also provided with apertures 42 constituting bearings for a pinion shaft 43 hereinafter described. These bearings are of a size merely sufficient to permit the free rotation of their shafts without permitting any loose play. Upon the part of the shaft 37 disposed between the supporting plate and one of the end brackets is threaded a set of numeral wheel units, *a*, *b* and *c*, designed to show mileage up to 99.9 miles and hereinafter referred to as the trip indicator.

Upon the portion of the shaft between the supporting plate and the other bracket is threaded a second set of numeral wheel units, *d*, *e*, *f*, *g* and *h* designed to show the total of miles traveled in succeeding trips and hereinafter referred to as the distance indicator.

An actuating control member 35 is secured to a square hub 36 which hub is rotatably mounted upon the shaft 37 adjacent the supporting plate 39 and between this plate and the low value numeral wheel unit *d* of the distance indicator. The control member 35 is provided with a gear wheel 79 adapted to mesh with a spiral worm-gear 34 forming part of the shaft 30 adjacent its forward end.

Referring to Fig. 6, it is noted that each of the numeral wheel units constitutes one element of a Geneva movement and are each made up of five elements, a two-toothed-disk 49, a notched disk 48, a numeral wheel 80 and a gear 45 disposed in order on a hub 82. Each of these parts have a square central opening 81 through which is threaded the square hub 82 opposite portions of which are slightly peened with a stuck-up portion to hold the elements in position and there is thus formed a unit, any number of which may be threaded on the shaft to make up either the trip or the distance indicator.

The control 35 includes two disk members arranged so that each rotation of one member will periodically rotate the other for a fraction of its complete cycle of revolution. The disk member 83, which constitutes the driving member, is provided with the gear wheel 79 and with one of the notched disks 48 forming the side thereof facing the distance indicator. The other disk 84 is positioned between the disk 83 and the low value numeral wheel unit *d* and is formed of one of the gears 45, a spacing plate 85 and one of the two-toothed disks 49 positioned in order from the disk 83 on a square hub 55 keyed to the shaft 37 by means of a spline extension slidably mounted in the keyway 56 which extends lengthwise of the shaft.

The two parts of the control 35 and the several numeral wheel units are all threaded on the shaft so that the sides formed by the disks 49 face in the same direction, with a gear wheel 48 of one unit adjacent the disk 49 of the next contiguous unit. The teeth 51 of the disk 49 extend radially from the periphery thereof and have an opening therebetween equal to and oppositely disposed to the trough-shaped recess 50 in the periphery of the disk 48, which periphery constitutes the smooth locking surface of the Geneva movement. The diameter of all the members forming the numeral wheel unit is substantially the same, which diameter includes the teeth in the cases of the members 45 and 49, so that there is formed in effect flat barrels, the periphery of which contain notches for co-acting with the pinions 44.

The shaft 43 is mounted relatively close to the periphery of these units and has a plurality of pinions 44 loosely mounted thereon with each pinion co-acting with one of the disks 48 to constitute the Geneva movements. The pinions 44 are disposed to extend between each of the wheel numeral units, and one of the pinions is disposed to extend between the disk members 83 and 84 of the control 35. The teeth of these pinions are alternately wide and narrow with all of the teeth constantly in mesh with the teeth of the gear wheel 45, and adjacent pairs of the wide teeth are adapted to ride on the periphery of the disk 48 thereby to lock the pinion against rotary movement until the forward of the pair of teeth 51 on the adjacent disk 49 engages the next broad tooth to swing the same into the alined openings formed by the recess 50, the pair of teeth 51 and the opening between the adjacent teeth of the gear 45.

The hub 82' which forms a part of the tenths-wheel unit $a$ is provided with an extension 60 (See Fig. 4) which projects through the journal 41 in the adjacent bracket 38 and has a pinion 59 fixed thereto externally of said bracket and constitutes one of a pair of co-acting clutch members. The other clutch member is in the form of a pinion 58 fixed directly to the shaft 37 to rotate therewith and held thereto by means of a pin and washer stop 86. The motion of the pinion 58 is conveyed to the pinion 59 by a re-set pinion 63 which bridges the pinions 58 and 59, and is mounted upon a stud 65 rotatably mounted in a boss 66 constituting part of the casing 10. The re-set pinion is normally held in its clutching position by means of the housed spring 64 which bears upon the casing and upon the stud. The outer end of the stud is provided with a knurled head 87 by means of which the pinion 63 may be rotated when moved into engagement with the trip indicator controlling pinion 59.

A diaphragm 71 is secured to the mounting plate 33, extends across the sight opening 77 and is provided with aperture slots 72 positioned opposite each of the numeral wheels 80.

In the construction of the instrument it is assumed that certain standard parts are carried in stock. For instance, the casing, together with the driving shaft 18 may be assembled as a unit. There may also be carried in stock a plurality of the numeral wheel units, together with two types of shafts 30, one type with the threads of the screw 34 arranged with a right hand inclination and the other type arranged with a left hand inclination so that the assembled instrument may be utilized for either a right hand or a left hand drive of the shaft 30. To mount the parts on the frame 33, a shaft is selected and the desired number of numeral wheel units, a control unit 35 and a supporting plate 39 are threaded on the shaft and this assemblage mounted between the end brackets 38 and fastened in position by the end pins after the pinions 58 and 59 are fixed in position.

The proper number of pinions 44 are threaded on the shaft 43. This shaft is then inserted in the bearings 42 and opposite ends pinched to hold the shaft in place. This construction forms a complete register which is mounted as a unit in the casing with the gear of the control meshing with the worm gear 34. The front closure is then mounted in position, thus constituting a means for retaining the mounted plate 33 and the mechanism carried thereby in its operative connection with the driving shafts.

In operation, the shaft 18 is suitably attached to the rotating member, the revolutions of which are to be counted and the rotation of the same will be transmitted through the meshed shafts 18 and 30 to the gear 79 on the control 35. At each revolution of the disk member 83, the teeth 51 and aperture 50 of the disks 49 and 48 carried thereby register with the pinion to rotate the same a distance equal to the distance between two adjacent wide teeth thereof, causing the intermediate narrow tooth to rotate the disk member 84 one-tenth of a complete cycle of revolution. As this disk member 84 is directly attached to the shaft, it causes the same to also describe a one-tenth revolution, and through the meshed pinions 58, 63 and 59 the tenths numeral wheel $a$ is rotated for a tenth of its cycle of revolution. When the disk member 84 has completed an entire revolution, its disk 49 is brought into operative engagement with the next pinion causing the rotation of the low value numeral wheel unit $d$ of the distance indicator, and at the same time, the tenths unit wheel $a$ correspondingly advances the wheel unit $b$ of the trip indicator. This action is continued, each numeral wheel unit advancing the next succeeding higher value wheel unit a tenth of a revolution for each complete revolution of the preceding unit, it being understood that each indicator automatically re-sets itself to its zero position after it has passed its highest indicating value. Should it be desired to re-set the trip indicator, the knurled head is forced inward against the action of the spring 64, removing the pinion 63 from its clutching position bridging the pinions 58 and 59 and into a position solely engaging the pinion 59. When in this position, the knurled head may be rotated in either direction until the desired reading is indicated through the sight opening 72. Releasing pressure upon the knurled head permits the spring 64 to act upon the pinion 63 and thus move the same automatically into its clutching engagement connecting the trip indicator with the control. Should the teeth of the pinions 58 and 59 be off-set in position to prevent the re-set pinion 63 from moving into its clutching position, these teeth will be alined as soon as there is any movement of the control and the pinion 63, acting under the tension of its spring 64 is always in position to snap into clutching position as soon as the teeth are alined.

By means of a device of this character, it is possible to construct practically all of the parts by a stamping operation and as all similar parts are interchangeable, the number of different parts is reduced to a minimum. The numeral wheel units are readily constructed by mounting the several parts in their proper order upon the square hub and as many of these units may be assembled on the shaft as desired.

This shaft 37 is not only supported at its end but is provided with one or more supports intermediate its ends which assist to maintain the shaft in alinement and minimizes the effect of any distorting strains on the same. This intermediate supporting plate does not have to be fastened to the mounting plate, but is free to adjust itself between the end bearings and acts as a spacing means to maintain the several wheel units in their proper position. The shaft 43 not only provides a support for the pinions but also assists in preventing canting of the supporting plate and assists to maintain the shaft journals in alinement.

The device possesses elements of compactness. One refinement of construction is that the block 60 carrying the low value numeral wheel unit *a* constitutes in effect a shaft telescoping the shaft actuated from the control, thus confining the parts to a relatively small space and insuring a positive co-acting relation between the several clutch pinions. The entire register may be conveniently demounted from the containing casing simply by removing the mounting plate and thus convenient access is provided to the several parts of the register in order to clean, adjust or repair the same. At the same time, the shaft 30 may be readily removed to insert a similar shaft having a different character of thread pitch to the worm gear 34, thus providing a means for actuating the instrument from a reverse drive or providing a means for calipering the instrument to agree with wheel peripheries of different lengths when the instrument is used as an odometer.

By simply manipulating the knurled re-set control head, the trip indicator may be re-set at its zero position or it may be re-set to give any desired initial reading, and this may be conveniently attained by rotating the head in the direction which will most quickly bring the numeral wheels to the position to give the desired reading, but this re-setting of the trip indicator can have no possible effect upon the reading of the distance indicator. The operator need not exercise extreme care in insuring the meshing of the clutch pinions as it is merely necessary to bring the characters approximately into their proper position as the automatic alining of the re-set pinion insures a proper registration of these parts as soon as the instrument starts to operate.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described, a register comprising a mounting plate provided with oppositely disposed integral end brackets formed of tongues bent at right angles to the plate to provide a rectangular sight opening in the plate, a supporting plate having a sliding fit between opposite sides of said opening and paralleling said end brackets, a shaft journaled in said end brackets and in said supporting plate, and a numeral wheel unit disposed between the supporting plate and each of said end brackets.

2. In a device of the class described, a register comprising a mounting plate provided with a pair of spaced brackets, a supporting plate having shoulders formed at the upper and lower edges thereof for engaging said mounting plate and free to move to and from said brackets, a shaft journaled in said brackets and in said supporting plate and numeral wheel units mounted on said shaft and substantially filling all spaces between the supporting plate and the end brackets.

3. In a device of the class described, a register comprising a mounting plate provided with a pair of spaced brackets, a supporting plate engaging said mounting plate and free to move to and from said brackets, thereby to accommodate different units adapted to be positioned between the shiftable supporting plate and the brackets, a shaft journaled in said brackets and in said supporting plate, numeral wheel units mounted on said shaft and substantially filling all spaces between the supporting plate and the end brackets, and a second shaft also journaled in said end brackets and in said supporting plate thereby to relieve the first shaft of distorting strains.

4. In a device of the class described, a register comprising a mounting plate provided with a pair of spaced brackets, a supporting plate engaging said mounting plate and free to move to and from said brackets, a shaft journaled in said brackets and in said supporting plate, numeral wheel units mounted on said shaft and substantially filling all spaces between the supporting plate and the end brackets, and a second shaft also journaled in said end brackets and in said supporting plate and positioned to the outside of said numeral wheel units and means carried by said second shaft for connecting certain of said units in operative relation, said shafts having a close fit in the shiftable supporting plate to prevent the same from canting.

5. In a device of the class described, a register comprising a mounting plate provided with fixed end brackets, a shaft adapted to be mounted for rotary movement in said brackets, a plurality of numeral wheel units adapted to be threaded on said shaft to fit between the end brackets, and a supporting plate adapted to be inserted on said shaft between a pair of said units, said plate having a relatively wide bearing on said mounting plate transversely of the length of the shaft and free to be adjusted along said shaft in mounting the units and shaft in the fixed end brackets.

6. In a device of the class described, a register comprising a mounting plate provided with an opening extending therethrough, a shaft carried by said plate, a plurality of numeral wheel units adapted to be threaded on said shaft, a separable supporting plate adapted to be inserted on said shaft between a pair of said units and having a part fitted within said opening and engaging said mounting plate, a second shaft paralleling said first named shaft and passing through said supporting plate to prevent canting of the same, means carried by said last named shaft for spacing said units and means engaging said spacing means for preventing the spacing means from rotary movement about said shaft.

7. In a device of the class described, a register comprising a mounting plate provided with a sight opening extending therethrough, a shaft carried by said plate, a plurality of numeral wheel units adapted to be threaded on said shaft, a supporting plate adapted to be inserted on said shaft between a pair of said units engaging said mounting plate across said opening, a second shaft paralleling said first named shaft and passing through said supporting plate to prevent canting of the same, means carried by said last named shaft for spacing said units and means for confining the end play of said units.

8. In a device of the class described, a register comprising a numeral wheel, a control member for said wheel, a pair of telescoping shafts, one of said shafts fixed to said wheel and the other shaft fixed to said control member, each of said shafts provided with a pinion, and a third pinion meshing with both of said first named pinions constituting a clutch for transferring the motion of said control member to said other wheel and means for moving said clutch into an inoperative position disconnecting said wheel from its control member.

9. In a device of the class described, a register comprising two numeral wheels, a driving mechanism therefor comprising two spur gear pinions mounted for rotary movement about a common axis, one of the pinions operatively connected to one of the numeral wheels and the other pinion operatively connected to the other numeral wheel, a third pinion normally meshing with both of said first named two pinions to form a clutch and a freely sliding push button device for moving said third pinion into an inoperative clutching position while maintaining a driving engagement with one of said spur gear pinions.

10. In a device of the class described, a register comprising two sets of numeral wheels, each wheel progressively controlling the next in order in its set, a control member, mechanism actuated by said control member for actuating the primary numeral wheel of one of said sets, a clutching means normally connecting said control member with the primary numeral wheel of the other of said sets and manually actuated means for moving said clutch into a position disconnecting one of said sets from said control and means for moving said clutching means into clutching position.

Signed at New Rochelle, in the county of Westchester and State of New York, this 13" day of May, A. D. 1915.

CLARENCE CARSON.

Witnesses:
   JAS. W. MOONEY,
   C. J. WARREN.